United States Patent [19]
Robinson et al.

[11] Patent Number: 5,474,463
[45] Date of Patent: Dec. 12, 1995

[54] BAY FOR RECEIVING REMOVABLE PERIPHERAL DEVICE

[75] Inventors: George Robinson, San Jose; John Zolkos, Union City; John A. Usher, Saratoga, all of Calif.

[73] Assignee: Greystone Peripherals, Inc., Los Gatos, Calif.

[21] Appl. No.: 97,260

[22] Filed: Jul. 26, 1993

[51] Int. Cl.⁶ .................................................. H01R 13/62
[52] U.S. Cl. ............................................................ 439/159
[58] Field of Search ................................... 361/684, 686, 361/725, 726, 727, 754, 798; 364/708.1; 439/152, 153, 159, 160, 188, 489, 490, 61, 67, 77

[56] References Cited

U.S. PATENT DOCUMENTS 5,010,426  4/1991  Krenz ........................................ 361/726
5,179,505  1/1993  Matsuo ...................................... 361/754

FOREIGN PATENT DOCUMENTS 273999  7/1988  European Pat. Off. ................ 439/160
128378  5/1989  Japan ...................................... 439/490

Primary Examiner—Daniel W. Howell
Attorney, Agent, or Firm—Townsend and Townsend and Crew

[57] ABSTRACT

A bay for receiving removable peripheral devices is disclosed. The bay of the present invention further offers a unique method of ejecting the peripheral device. In addition the bay of the present invention offers a less expensive solution for the users of desk top computers.

63 Claims, 12 Drawing Sheets

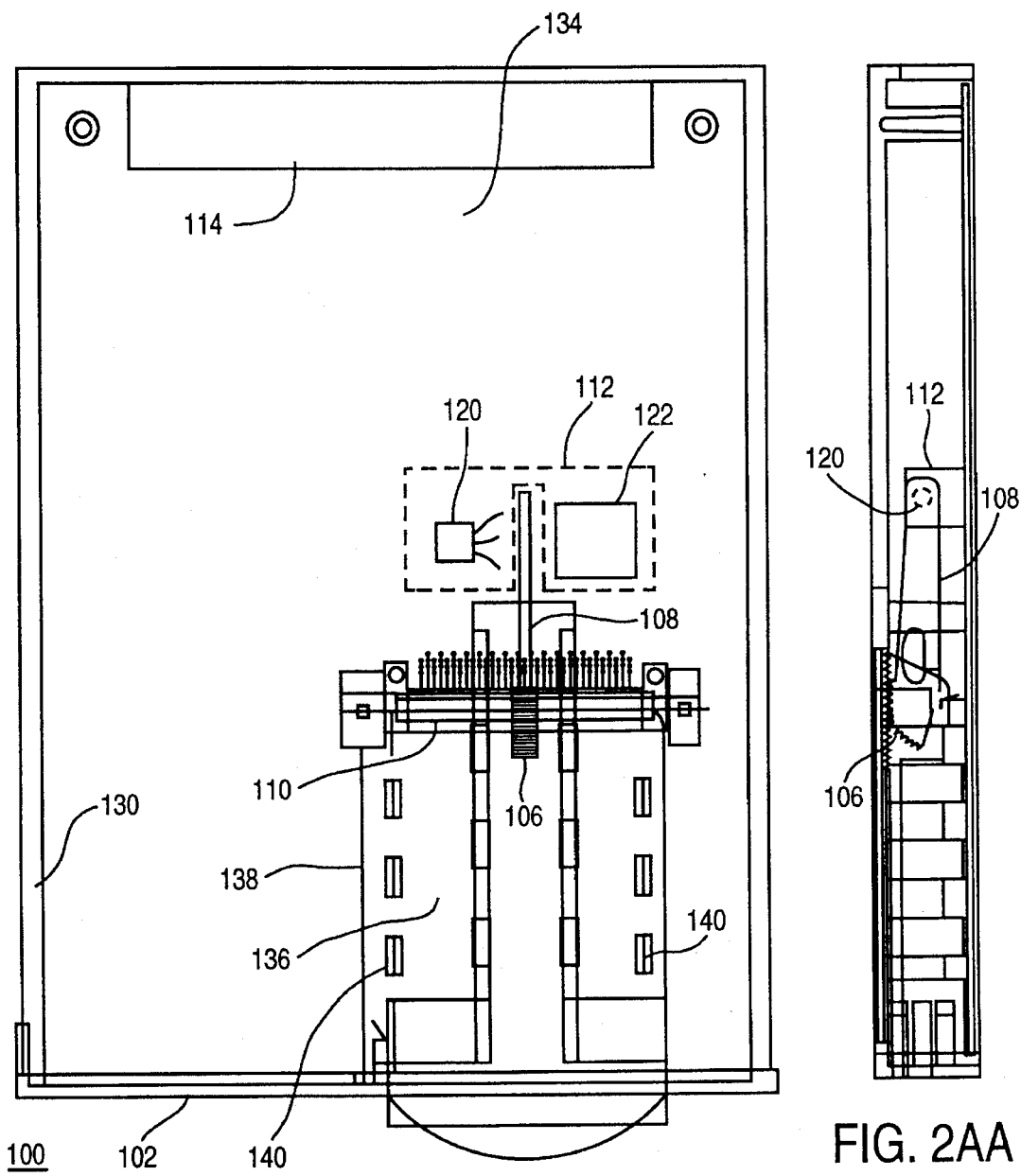
FIG. 2A
FIG. 2AA
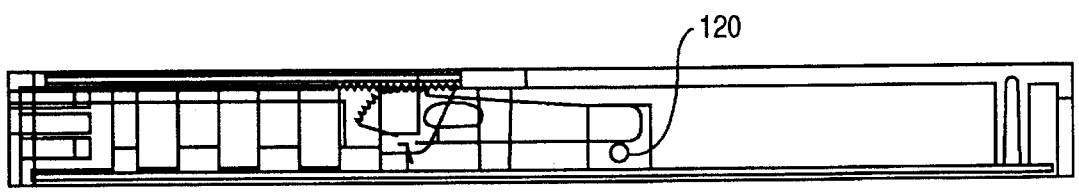
FIG. 2B (PRIOR ART)

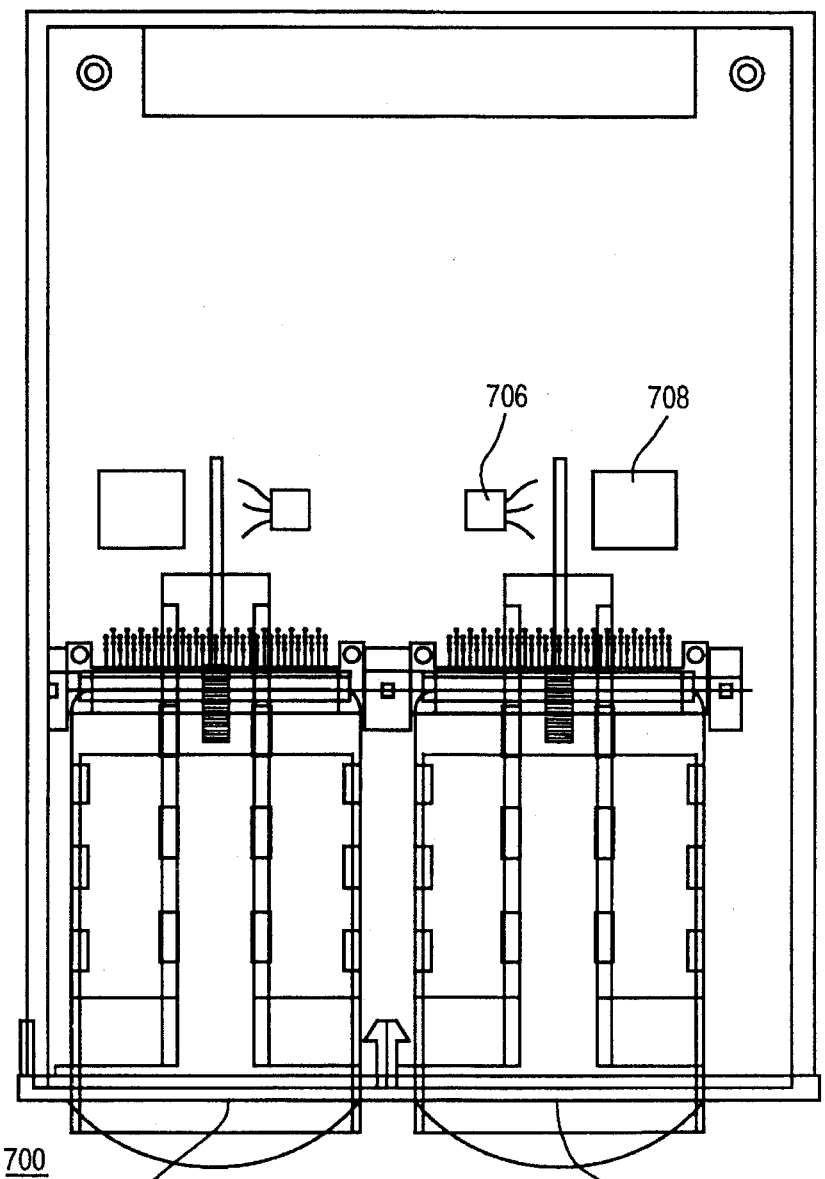
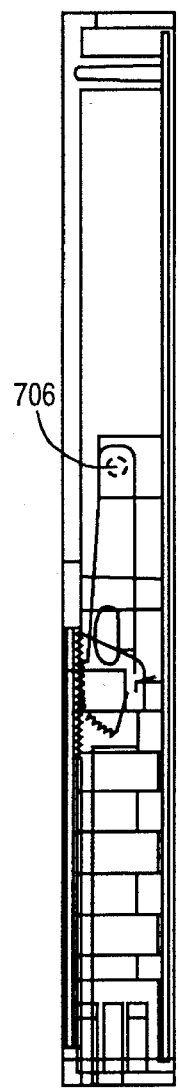
FIG. 8A
FIG. 8AA
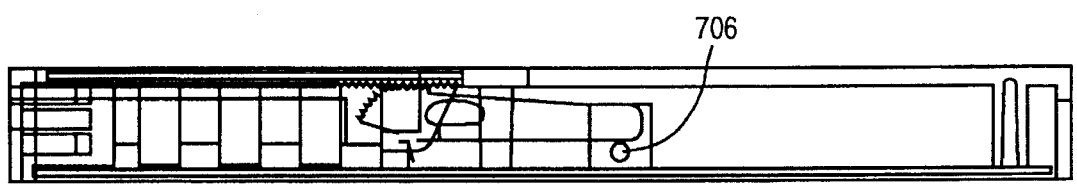
FIG. 8B

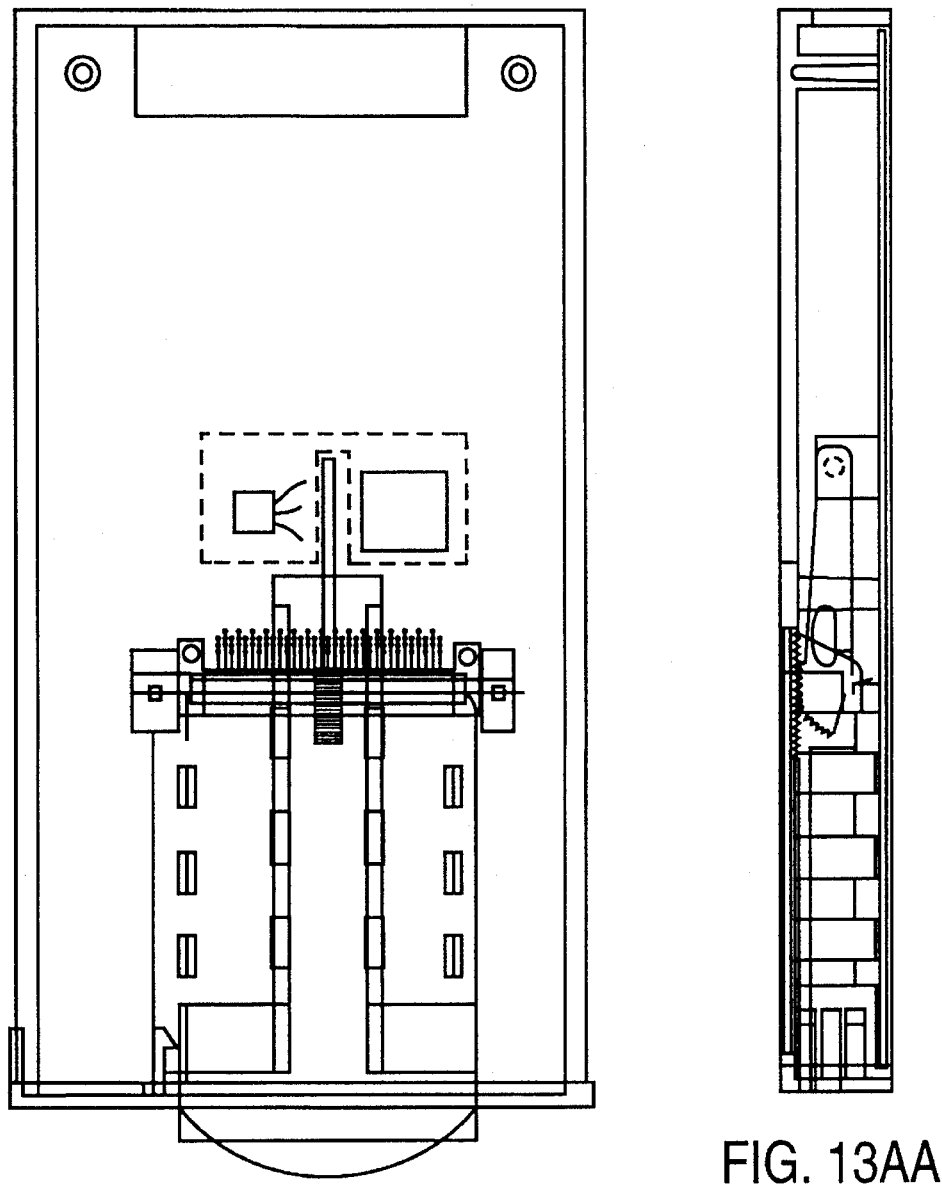
FIG. 13A
FIG. 13AA
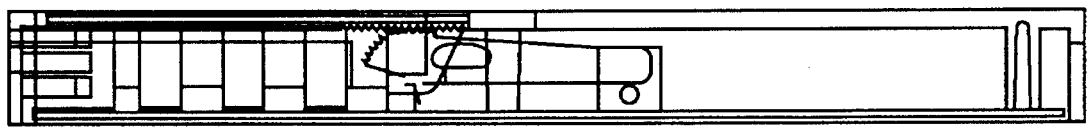
FIG. 13B

BAY FOR RECEIVING REMOVABLE PERIPHERAL DEVICE

BACKGROUND OF THE INVENTION

The present invention relates to the field of computer peripherals. More specifically, it relates to an apparatus that receives removable peripheral devices.

Advancing technology enables the electronic companies to design and manufacture new peripheral devices for today's computer systems. These devices offer either new designs or an improvement to the existing designs. Among the attributes of these devices are their size, speed and, where applicable, capacity. The biggest advantage of these devices is their size. The manufacturers are able to package a complete and operable device in a housing as small as a standard credit card in width and length, with a thickness of less than ¾ of an inch.

Among these new devices are those designed to fit the limited size of lap top computers. These devices take advantage of a new standard called Personal Computer Memory Card International Association ("PCMCIA"). This standard was originally used in designing portable solid state memory cards. However, it is becoming increasingly popular in the electronic industry, specifically it is used in the industry supporting lap top computers. For example, hard disk drives, modems, ethernet cards, etc., are being designed using the PCMCIA standard.

As mentioned above, the biggest advantage of these devices is their small size, which makes them easily portable. This feature makes these devices very attractive for use in desk top computer systems. A manufacturer or user of desk top computers can fit up to four of these devices in half of the area allocated for standard 5¼ inch floppy disk drive bays. However, these devices require bays that allow them to interconnect with the desk top host computers. The existing bays for desk top computers fall into two categories. One category comprises those bays that have no ejections mechanism; thus, the user must physically pull the device out of the bay. The second category comprises those bays that have some sort of eject mechanism. However, there are some problems associated with their eject mechanism. The following is a description of how a bay according to each of the above two categories operates.

FIG. 1a illustrates a bay 10 according to the first category of prior art. To use a PCMCIA device, the user must insert the device into recess 12 and push it in so that the PCMCIA connector of the device fully interconnects with the PCMCIA connector of bay 10. To remove the device, the user must manually pull the device out of bay 10.

FIG. 1b illustrates a bay 20 according to the second category of prior art mentioned above. To use a PCMCIA device, the user must slide the device into cavity 22. The PCMCIA device slides in with the help of guiding rails 24. The male PCMCIA connector 26 in the back of bay 20 connects to the female PCMCIA connector of the particular device. The computer communicates with the device through an interface board and the connectors. The interface board is connected to one of the interface slots of the computer. The interface board generates the necessary signals which both the PCMCIA and the host computer can understand. To eject the device, lever 28 must be pushed in the direction of the arrow. This causes a plate 30 at the back of bay 20, underneath connector 26, to push the device out of the bay. The following is a description of the problems associated with the bays from both categories.

When the devices in either of the above two bays communicate with the host computer, they are constantly either sending data to the host computer, or receiving data from the host computer. When the user desires to disconnect the device from either of the two bays, the computer must be notified before the two PCMCIA completely disconnect so that it may complete the task it is currently executing. This task may comprise communication of important data between the device and the computer. Furthermore, to prevent any possible damage to the device, there may be a need to disconnect the power to the device before it is disconnected from the bay.

The advance notice is necessary to prevent any possible loss of data caused by an abrupt halt of the data communication, or to prevent possible damage to the device. The advance notice requires the communication of a signal to the host computer which represents the intent-to-eject before the complete ejection takes place. In addition, the time lapse between the reception of the signal by the host computer and the complete ejection must be sufficient for the host computer to either complete the task that it is executing, for example data communication, or disconnect the power to the device. "Complete ejection" refers to the case where the PCMCIA of the bay is completely disconnected from the connector of the device.

The bays in the two categories mentioned above take advantage of the unique length of two of the pins, one on either side of the connector, of the PCMCIA connector to generate an intent-to-eject signal. These two pins are shorter than the other pins of the PCMCIA connector. When the plate under connector 24 pushes the device out of the bay, or when the user manually pulls the device out, these two pins are first to separate from the corresponding holes of the PCMCIA connectors of either bays. The interface board detects this condition and sends a signal to the host computer. Responding to this signal, the host computer either completes the task being currently executed or disconnects the power to the device. However, sometimes the length of this period, which is from the moment the interface board detects the intent-to-eject to the moment the device completely separates from either of the two bays, is not sufficient for the computer to complete the task it is executing or to disconnect the power from the device. In these situations, the ejection leads to loss of data being transferred between the device and the host computer or results in damage to the device. Although, the problem is associated with both bays, it is more noticeable where the user must manually remove the device from the bay. Sometimes, the user removes the device so fast that there is almost no time for the host computer to react to protect the data or the device.

The second problem is the price of the present bays, specifically bay 20 in FIG. 1b; each PCMCIA connector and eject mechanism costs more than $8.00 which greatly increases the cost of the present bays. Where a low cost computer system is desired, the current bays may not be the ideal solution.

Finally, some peripheral devices require external connection to a telephone line or other equipments. For example, a fax/modem card requires external connection to a telephone line. These devices normally have a receiving connector allowing them to connect to the cable from the telephone jack or from other equipments. If the bay is connected to the front of the host computer, the external cable must be connected to the device on the front of the host computer. This could cause problems when several of these devices requiring external connections are connected to the host computer. For example, if a fax/modem and an ethernet peripheral device is connected to the host computer, there will be one cable connecting each of the two devices to the telephone jack. If only one telephone line is being used, the user must physically switch the telephone cables connected to the telephone jack depending on which device is being used. In addition to the inconvenience of switching the telephone cables, there is always a chance of connecting the wrong cable to the telephone jack, especially where more than two or three telephone cables are hanging from the front of the computer.

One solution to this problem is to connect the bay to the rear of the chassis of the host computer. This would eliminate the cluster of cables in front of the host computer; however, it requires turning the computer chassis each time a device needs to be connected or disconnected. This may not be feasible where the user has one bay and needs the services of several peripheral devices.

Therefore, it can be appreciated that there is a need an improved bay to be used in the desk top computer systems. A bay that has a better ejection mechanism, cheaper price, and a solution for external connections.

SUMMARY OF THE INVENTION

The present invention is directed towards a bay for receiving removable peripheral devices. The bay according to the present invention includes a housing, a mounting means for receiving at least one device in an operable position, at least one ejector means, at least one detecting means, a means for communicating signals to the computer system, and at least one connector. The bay further includes a communication plug and an I/O connector. The mounting means includes a receiving recess to receive the device. The housing further has a front cover with an opening that allows the device to enter the receiving recess. Once the device is inserted into the above receiving recess, the connector of the device interconnects with the connector of the bay. This enables the computer system to access the device via an interface board and the communicating means.

Once the user desires to remove the device, the ejector means allows the user to push the device out of the bay. At the beginning of the ejection process, the detector sends an intent-to-eject signal to the host computer. The period between receiving the intent-to-eject signal and the actual ejection of the device is sufficient for the computer to complete the task that is being executed or to disconnect the power to the device. Once the task is completed or the power is disconnected, the device can be safely ejected by the ejector means. Furthermore, if a particular device requires external connections, the present invention allows for this connection through the communication plug.

In another embodiment of the present invention, the housing is capable of receiving two devices. In a third embodiment of the present invention, two of the bays according to the second embodiment can be assembled to provide a bay assembly that provides four bays in one package.

Therefore, the present invention offers a bay with an improved eject mechanism. The present invention also offers an eject mechanism that is easily accessible by the user. The present invention also enables having two bays in a single housing. Furthermore, the present invention enables combining two housings, each with two bays, to provide a four bays in one package. Finally, the present invention offers an economical bay assembly.

BRIEF DESCRIPTION OF THE DRAWINGS

FIGS. 2a and 2aa illustrate a first embodiment of the bay according to the present invention;

FIG. 2b shows an alternative position for the light source in FIG. 2a;

FIG. 2c illustrates a typical PC board used in the embodiment of FIG. 2a;

FIG. 2d illustrates an alternative board used in the embodiment of FIG. 2a;

FIG. 2e is a cross sectional view of the connection between the board and the wire of FIG. 2d;

FIGS. 5 and 5aa illustrate the rack used in the bay of the present invention;

FIG. 8a illustrates a second embodiment of the bay according to the present invention;

FIGS. 8aa and 8b show an alternative position for the light source in FIG. 8a;

FIG. 9 illustrates the top plate of the bay in FIG. 8a;

FIG. 10 illustrates the front cover of the bay in FIG. 8a;

FIG. 11 illustrates a two bay assembly using the bays in FIG. 8a;

FIG. 13a illustrates a third embodiment of the bay according to the present invention;

FIGS. 13aa and 13b show an alternative position for the light source in FIG. 13a;

FIG. 14 illustrates the top plate of the bay in FIG. 13a;

FIG. 16 illustrates a two bay assembly using the bays in FIG. 13a; and

DESCRIPTION OF THE PREFERRED EMBODIMENT

Figure 1A:
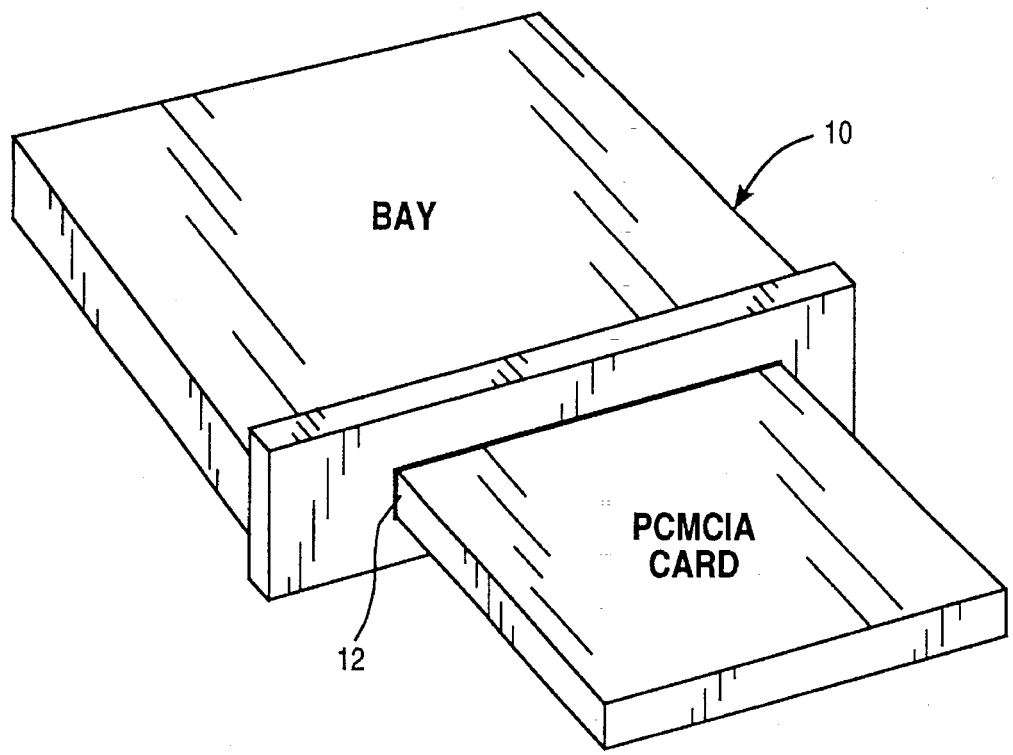
FIGS. 1a and 1b show the prior art bays.
Figure 1B:
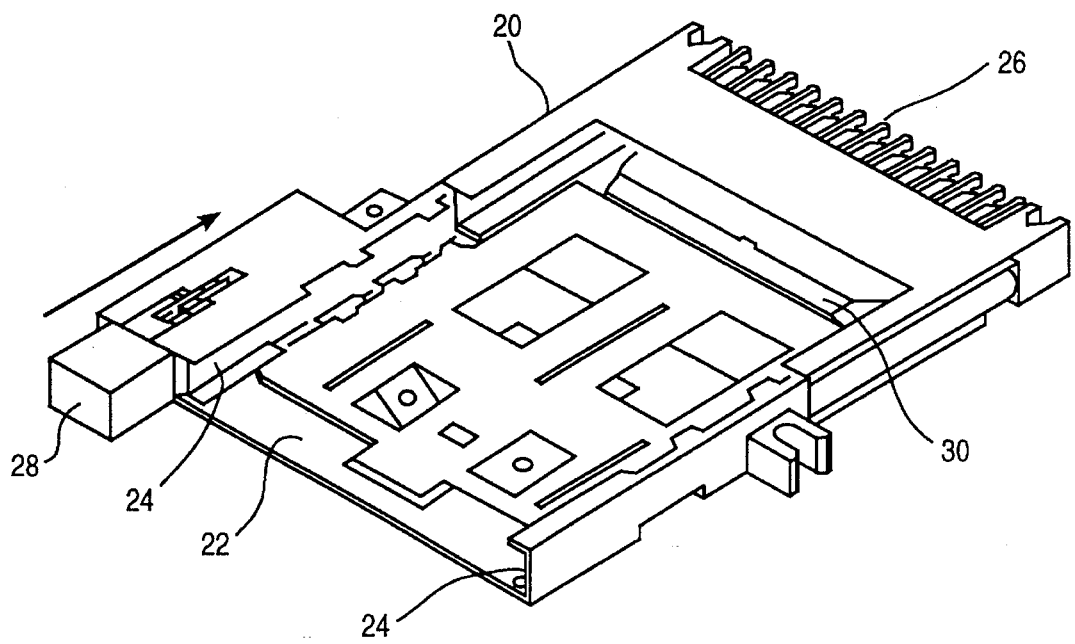

The present invention offers an apparatus for receiving removable peripheral devices. The apparatus of the present invention further utilizes a unique mechanism of ejecting the device. Below, the apparatus according to the present invention will be described with reference to FIGS. 2–17.

FIG. 2a illustrates a first embodiment of the bay according to the present invention. FIG. 2a shows the bay from the bottom and side views. Bay 100 of FIG. 2a includes housing 102, a rack 104, a pinion 106 (seen in the side view), an eject indicator 108, a PCMCIA connector 110, a detector 112, and an input/output ("I/O") connector 114. The combination of rack 104, pinion 106, eject indicator 108, and a detector 112 forms a unique eject mechanism used in the present invention. Detector 112 includes a photodetector 120 and a light source 122. It should be noted that the choice of detector 112 is not limited to what is used in this embodiment. Other detectors that perform the same function may be utilized with the present invention. The separately describes each element of bay 100.

Figure 2C:
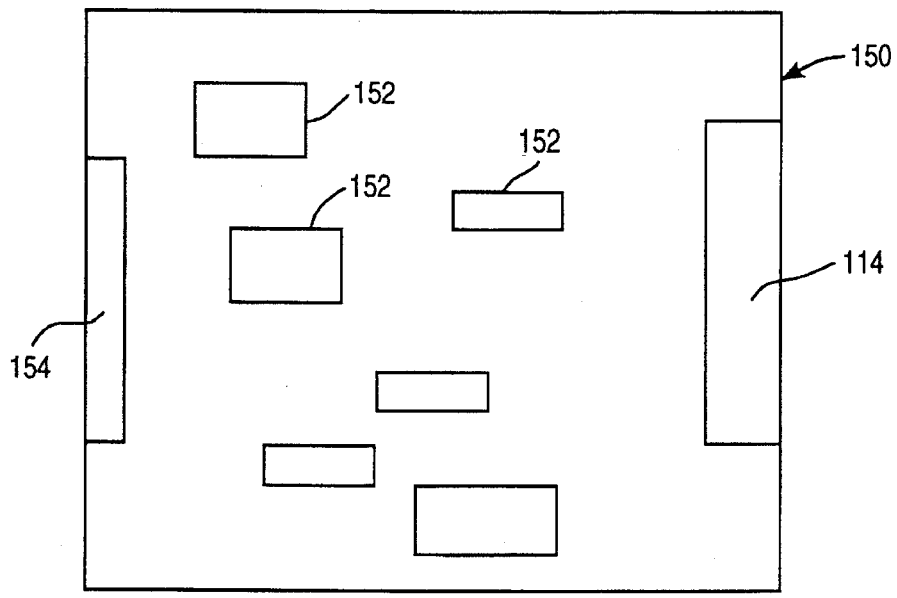

Housing 102 of FIG. 2a is made of an injected plastic and includes a top plate (not shown), side walls 130 and 132, and bottom plate 134. In the embodiment of FIG. 2a, the bottom plate comprises a PC board which is shown in FIG. 2c to facilitate communication between the device and the host computer. PC board 150 includes the necessary electronic components 152 to provide a communication channel between the device and the host computer. PCMCIA connector 110 connects to PC board 150 via pad 154. Connecter 114 which is connected to PC board 150 provides the means for connecting Pc board 150 to the interface board in the host computer. PC board 150 is physically connected to the interface board in the host computer via a cable assembly. The cable assembly has two connectors, each connected to one end of the cable. Each of these connectors mate with the respective I/O connector on PC board 150 or interface board. The cable assembly greatly increases the cost of the present invention since the connectors are very expensive.

Figures 2D, 2E:
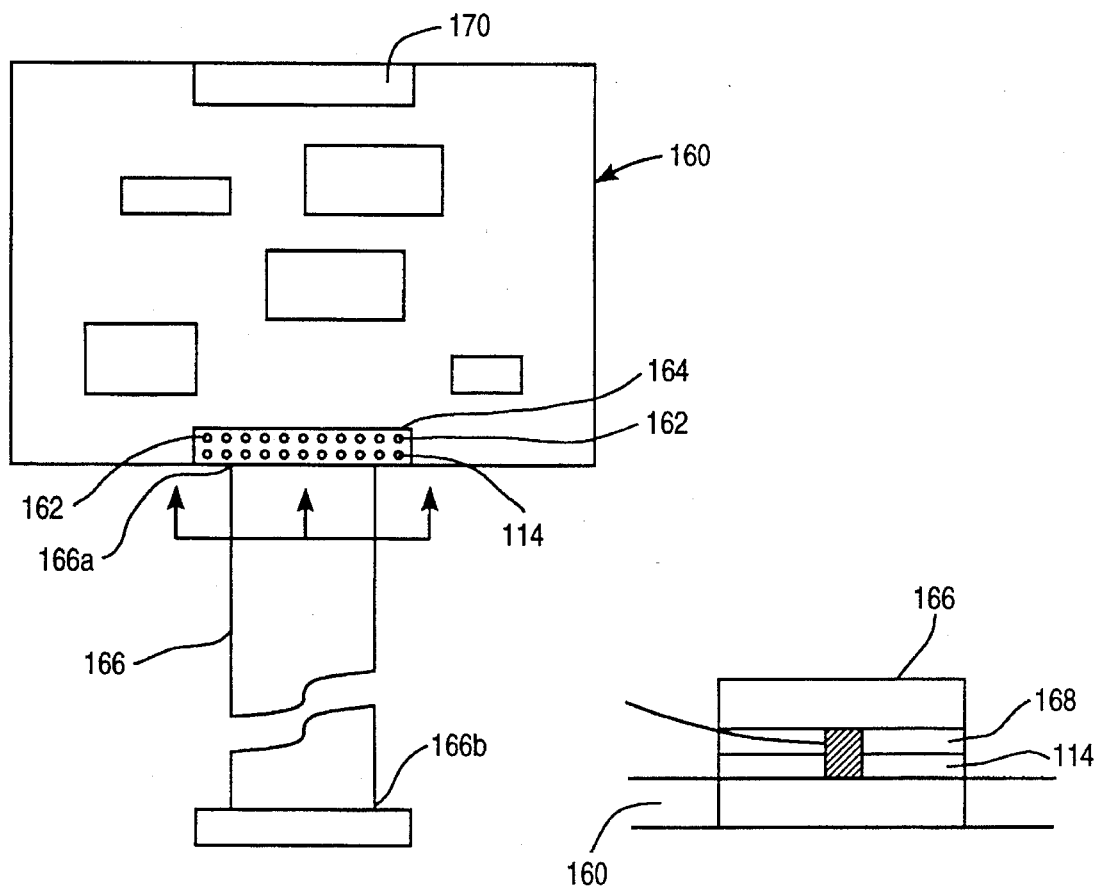

FIG. 2d illustrates an alternative and less expensive means of establishing a channel of communication between the device and the host computer. FIG. 2d shows a flex circuit board 160 which includes a thin layer of material made of polyamide and a layer of conductive material on top of the thin layer. The actual circuit is etched on the conductive material and includes several specific regions to load the electronic components. PCMCIA connector 110 connects to flex circuit board 160 via pad 170. The electronic components are connected to the flex circuit board using the well known surface mount technology. To provide an I/O connector similar to I/O connector 114, a number of conductive pads 162 are provide on the flex circuit as shown in box 164. The number of these conductive pads depends on the design of the electronic circuit implemented on the flex circuit board. For consistency, the I/O connector on the flex circuit board will also be referred to as the I/O connector 114.

To connect I/O connector 114 in FIG. 2c to the interface board in the host computer system, a special cable 166 is used. Cable 166 is an elongated flex circuit board having a number of thin conductive strips deposited on its surface. On one end 166a, it includes a connector 168 (shown in FIG. 2e) similar to I/O connector 114 of flex circuit 160. To connect cable 166 and flex circuit 160, connectors 114 and 168 are placed on top each other and are bonded using a well known crimping procedure. FIG. 2e is a cross sectional view taken in the direction of the arrow which shows how wire 166 and flex circuit 160 are bonded together. FIG. 2e shows the connection between the respective conductive pads on either surface.

There is a suitable mating connector connected to the other end 166b of cable 166 depending on whether the interface board in the host computer system is made of rigid PC board or flex circuit board. If the interface board comprises a rigid PC board with a connector similar to I/O connector 114 of FIG. 2c, end 166b will be connected to a standard connector which is capable of mating with the connector on the interface board. If the interface board comprises a flex circuit board, end 166b will comprise a connector similar to connector 168 and connects to the interface board using the crimping procedure. The price of manufacturing the flex circuit board and the flex wire is far less than the price for a rigid PC board with an I/O connector and a cable assembly.

Figure 3:
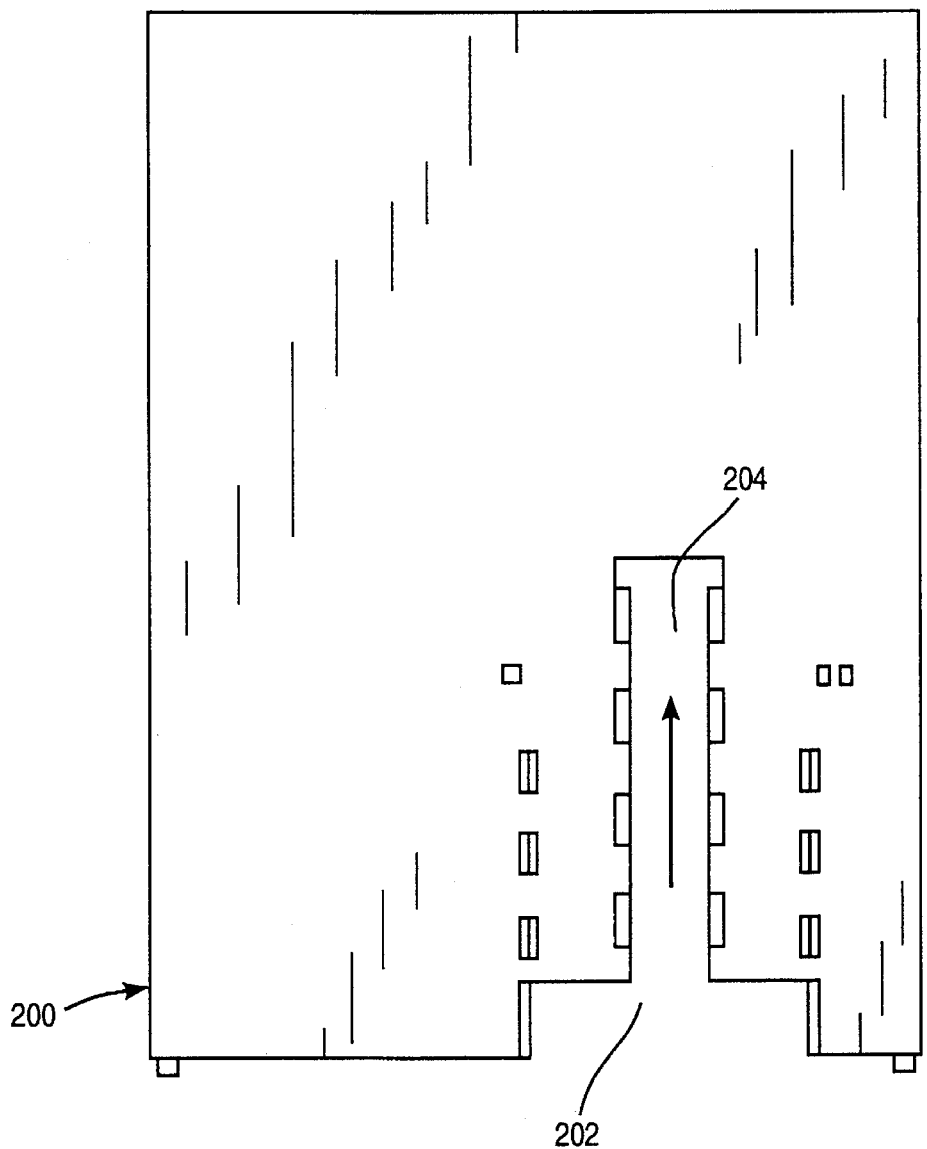
FIG. 3 illustrates a top plate of the bay in FIG. 2.

Returning to FIG. 2a, housing 102 further includes a mounting recess 136 which allows the housing to receive the peripheral device. Mounting recess 136 is formed by the top plate, either of side walls 130 or 132, bottom plate 134, a separating wall 138, and connector 110. The portions of either of the two side walls and the separating wall which forms mounting recesses 136 include guiding rails 140 for allowing the device to slide in and out of mounting recess 136. FIG. 3 illustrates the top plate 200 of housing 102 in FIG. 2a. Top plate 200 includes a pair of recesses 202 and 204, as shown. The combination of these two recesses provides for a space for the rack to move back and forth in the direction of the arrow.

Figure 4:
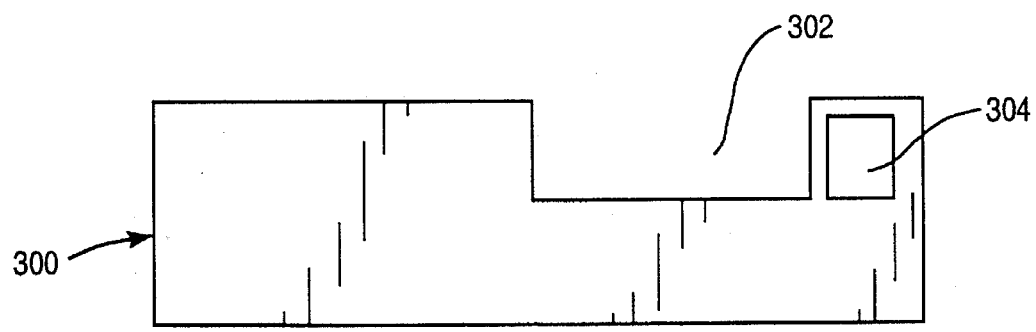
FIG. 4 illustrates the front cover of the bay in FIG. 2.

FIG. 4 illustrates the front cover 300 of the housing in FIG. 3. Front cover 300 includes openings 302 and 304. Opening 302 has the same dimensions (width and length) as mounting recess 208 in FIG. 3. When front cover 300 is attached to the housing, the edges of opening 302 overlap with the edges of the mounting recess. Opening 304 provides a space to mount a communication adaptor plug. The function of this communication plug will be fully described below.

Figure 5A:
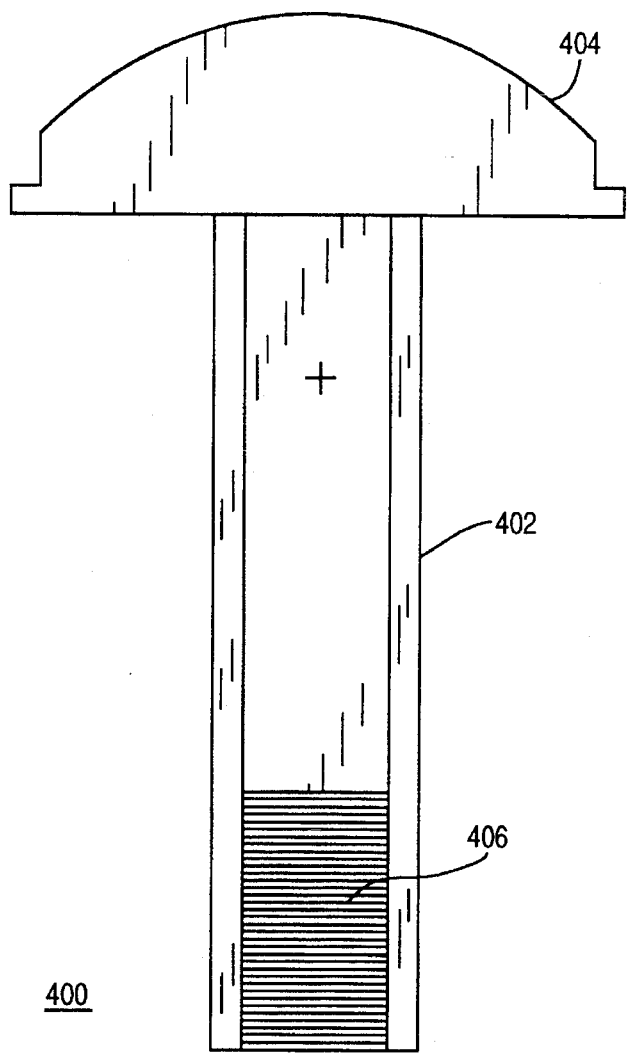
Figure 5A:

FIG. 5 illustrates the top and side views of rack 104 of FIG. 2a. Rack 400 of FIG. 5 includes an elongated narrow part 402 and a wider projecting part 404. The projecting part 404 is connected to one side of elongated part 402. The other side of elongated part 402 includes a set of teeth 406. Teeth 406 are constantly meshing with a set of teeth 506 of pinion 500 in FIG. 6. Upon assembly, elongated part 402 enters recess 202 of FIG. 3, and projecting part 404 fits into recess 204 of FIG. 3. When rack 400 moves back and forth in the direction of the arrow in FIG. 3, it forces pinion 500 to rotate and cause the ejection of the device.

Figure 6:
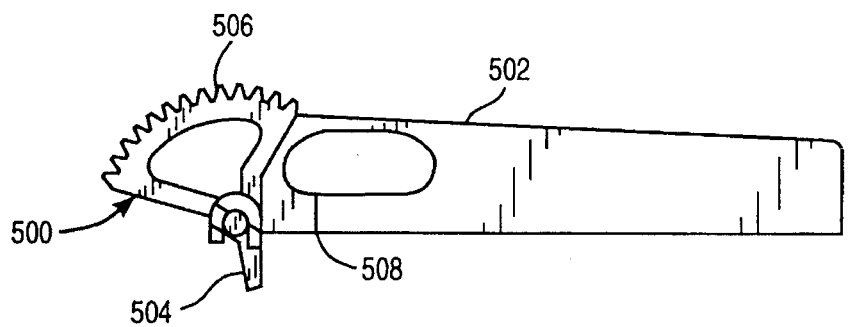
FIG. 6 illustrates the pinion assembly used in the bay of the present invention.

FIG. 6 includes pinion 500, eject indicator 502, ejector tabs 504 (only one shown), and teeth 506, connected as shown in FIG. 6. Eject indicator 502 has a gap 508, shown as a solid line, on its lower part. Gap 508 allows eject indicator 502 to bend when it hits the bottom of the housing as pinion 500 rotates further in a clockwise direction. This prevents any damage to eject indicator 502 during the eject process. To eject a device, ejector tabs 504 must push against the back of the device; this occurs when pinion 500 rotates further causing ejector tabs 504 to contact the back of the device and push it out. This operation will be better understood during the following detailed description of how the bay of the present invention operates, with reference to FIGS. 2a, 2b, and 7.

Figure 7:
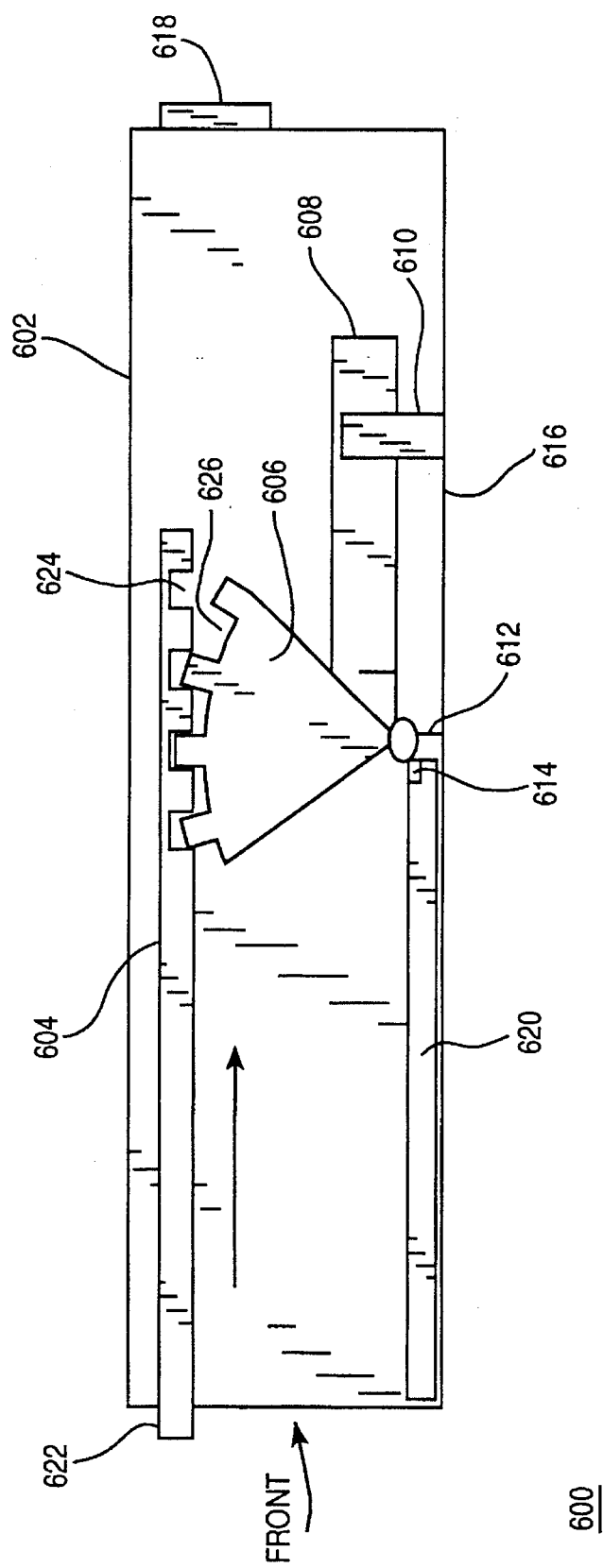
FIG. 7 illustrates a typical bay from the side view having a device inserted in the reception cavity of the bay.

FIG. 7 shows a complete assembly of a bay according to the present invention as seen from the side of the bay. Bay 600 includes housing 602, rack 604, pinion 606, eject indicator 608, detector 610, ejector pins 612 (only one shown), PCMCIA connector 614, PC board 616, I/O connector 618, and device 620. Peripheral device 620 must be inserted in bay 600 through the receiving recess (not shown) to be used by the host computer. Each device has a female version of the PCMCIA connector which mates with connector 614, which is the male version of the PCMCIA connector. The host computer communicates with the device via an interface PC board which is connected to the host computer's interface slot. The interface board is designed to facilitate communication between the host computer and a device using a PCMCIA connector. Furthermore, to be able to communicate with the device, the host computer must use a specific software written for PCMCIA interface applications. This software is a standard software package available from different manufacturers. The following is a description of the ejection process.

As mentioned before, to prevent loss of data, the host computer must complete the transfer of data before the device is disconnected from the bay. Furthermore, when it is required, the host computer must disconnect the power which is applied to device 620 through the respective pins of connector 614 before device 620 is completely ejected from the bay. To perform either tasks, the host computer must be notified of the decision to eject the device. The host computer must be notified well before the actual ejection takes place. As mentioned before, the present notification process may not provide enough time for the computer to respond. Accordingly, the present invention offers the following eject mechanism which notifies the host computer well before removal of the device. This signal is in addition to the notification signal presently generated. The combination of these two signals provide the host computer with ample time to react.

Before describing the ejection process, it is necessary to describe two mutually independent positions of light source in FIG. 7. Depending on the position of light source 120, photodetector 122 generates an intent-to-eject signal upon detecting the light rays or the lack of light rays. The side view of housing 102 in FIG. 2a shows the situation where light source 112 is located such that eject indicator 108 is positioned between light source 120 and photodetector 122 when the device is in the bay. In this situation, photodetector 122 generates the intent-to-eject signal upon detecting the light rays from light source 120. FIG. 2b shows the situation where light source 112 is located such that eject indicator 108 is not located between light source 120 and photodetector 122, and photodetector 122 detects the light rays when the device is in the bay. In this situation, photodetector 122 generates the intent-to-eject signal upon detecting the absence of light rays from light source 120. Generation of the intent-to-eject signal in either situation will be described below.

To eject the device, rack 604 must be pushed using projecting part 622 in the direction shown by the arrow in FIG. 7. In the embodiment of FIGS. 2a or 7, rack 604 must move a total of twelve millimeters for a complete ejection of device 620. The first two millimeters of this movement forces pinion 606 to rotate in a clockwise direction. As pinion 606 rotates, it forces eject indicator 608 to move in a downward direction. If eject indicator 608 is originally blocking the light, its movement allows the light rays to reach the photodetector. Reacting to the presence of the light, photodetector 122 of FIG. 2a sends a signal to the host computer via PC board 616, I/O connector 618, and the interface board. Where eject indicator originally does not block the light rays, its movement prevents the light from reaching photodetector 122 in FIG. 2a. In this situation, photodetector 122 generates an intent-to-eject signal responding to the lack of light. Responding to the signal from photodetector 122 in FIG. 2a, the host computer either completes the task it is currently executing or disconnects the power to device 620, or both. The following is a description of how device 620 is completely disconnected from bay 600.

The first two millimeters of displacement of rack 604 places eject tabs 612 into contact with the back of the device. The remaining ten millimeters of displacement of rack 604 forces further rotation of pinion 606, causing eject tabs 612 to push device 620 out and totally disconnect the two PCMCIA connectors from each other. The user can now remove the device from the bay.

The present invention also provides a solution to the problem caused by a possible cluster of cables connected to the front of the computer. Referring back to FIG. 4, it shows an opening 304 to house a communication plug (not shown). The plug is a universal plug and facilitates the connection of the device to the bay through an adaptor. The adaptor eliminates the need to change the plug for each particular device.

The plug connected to the front cover 300 is connected to a second communication plug in the back of the host computer via cables. The second communication plug receives the external cables, such as a telephone cable. The existence of an assembly of two plugs and the connecting cables eliminates the possibility of having a cluster of external cables on the front of the host computer. Furthermore, this assembly eliminates the need to physically switch the telephone cables which connect each device to the telephone jack. The user only switches the adapters used to connect each device to the communication plug connected to opening 304.

FIG. 8a illustrates a second embodiment of the present invention. It shows a bay 700 which is capable of accepting two devices at the same time. Individual bays 702 and 704 are the exact replica of bay 100 in FIG. 2a and operate exactly the same way, as explained with reference to FIG. 7. It should be noted that the total outer dimensions of housing 704 is exactly the same as housing 102 in FIG. 2a. Furthermore, there are two I/O connectors connected to the back of housing 700. Each of these I/O connectors facilitate communication between its respective bay and the host computer through the interface board. Where the flex circuit board of FIG. 2c is used in either bay 702 or 704, the flex circuit board will have one I/O connector and one flex wire for each of bays 702 and 704.

Figure 9:
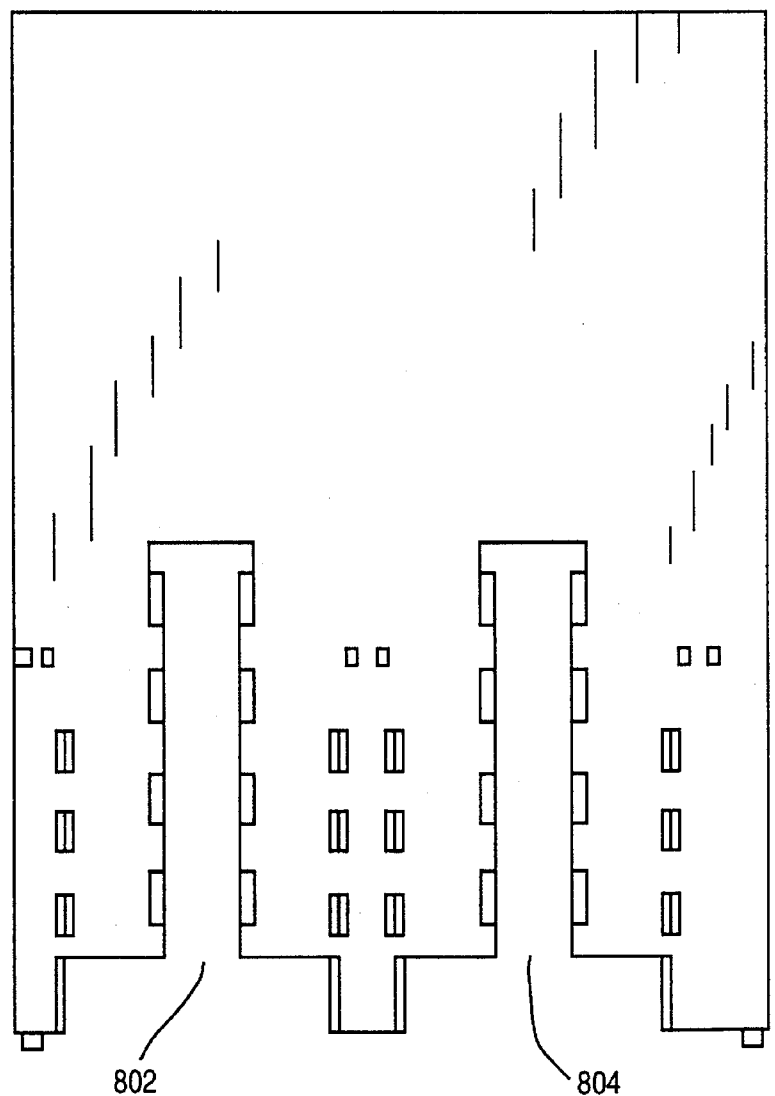
Figure 10:

FIG. 8b shows an alternative position for light source 706. As explained before, depending on the position of light source 706, photodetector 708 generates the intent-to-eject signal upon detecting the presence or the absence of the light. FIG. 9 illustrates the top plate of bay 700 of FIG. 8a. It includes a pair of recesses 802 and 804, each allowing a respective rack to move in the direction shown in FIG. 9. FIG. 10 illustrates the front cover 850 for bay 700 of FIG. 9. It has two openings 852 and 854 that match the openings of the two cavities in housing 704. It further includes an opening 856 to house a communication plug.

Figure 11:
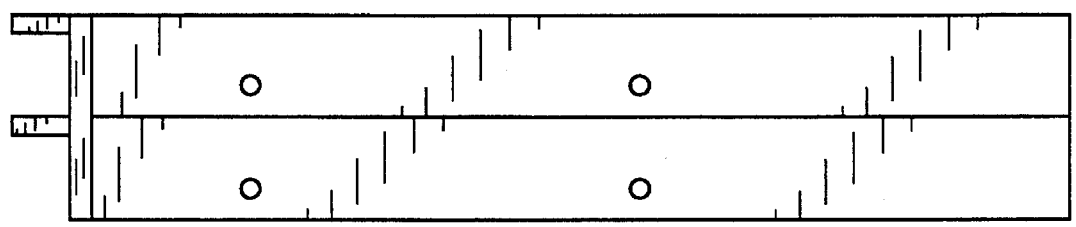
Figure 12:
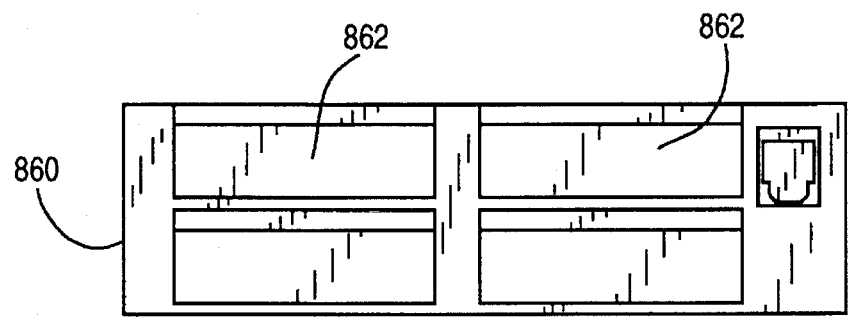
FIG. 12 illustrates the front cover for the assembly of FIG. 11.

The dimensions of the housings in FIGS. 2 and 8 are designed such that a pair of them fit in a space allocated for a half height standard 5¼ inch floppy disk bays. FIG. 11 illustrates how a pair of bays according to embodiment of FIG. 8a provides the capability of having four bays to be used for different combinations of devices. For example, the user can have two hard disk drives, a fax/modem, and an ethernet device connected to the computer at the same time. FIG. 12 illustrates front cover 860 used to cover the housing assembly of FIG. 11. It should be noted that the dimensions of front cover 850 and front cover 860 are identical, except that front cover 860 has four openings 862 to cover the four receiving recesses of FIG. 11. Of course, there is only one space for communication plug regardless of the number of opening for receiving peripheral devices.

FIG. 13a illustrates the bottom and side views of a third embodiment of the present invention. This embodiment includes all of the parts shown in bay 100 of FIG. 2a. The description and method of operation of all individual parts of the embodiment of FIG. 13a is identical to the respective parts in the embodiment of FIG. 2a. The only difference between the embodiment of FIG. 13a and the embodiment of FIG. 2a is the difference in the dimensions of the housings. Housing 102 of bay 100 in FIG. 2a is designed to fit into the space allocated for a half height 5¼ inch disk drive bay. Whereas, housing 902 of bay 900 in FIG. 13a is designed to fit into the space allocated for a standard half height 3½ inch disk drive bay. Otherwise, housing 902 comprises all of the parts of housing 102 of FIG. 2a. Finally, the operation of bay 900 in FIG. 13a is identical to the operation of bay 100 in FIG. 2a.

Figure 14:
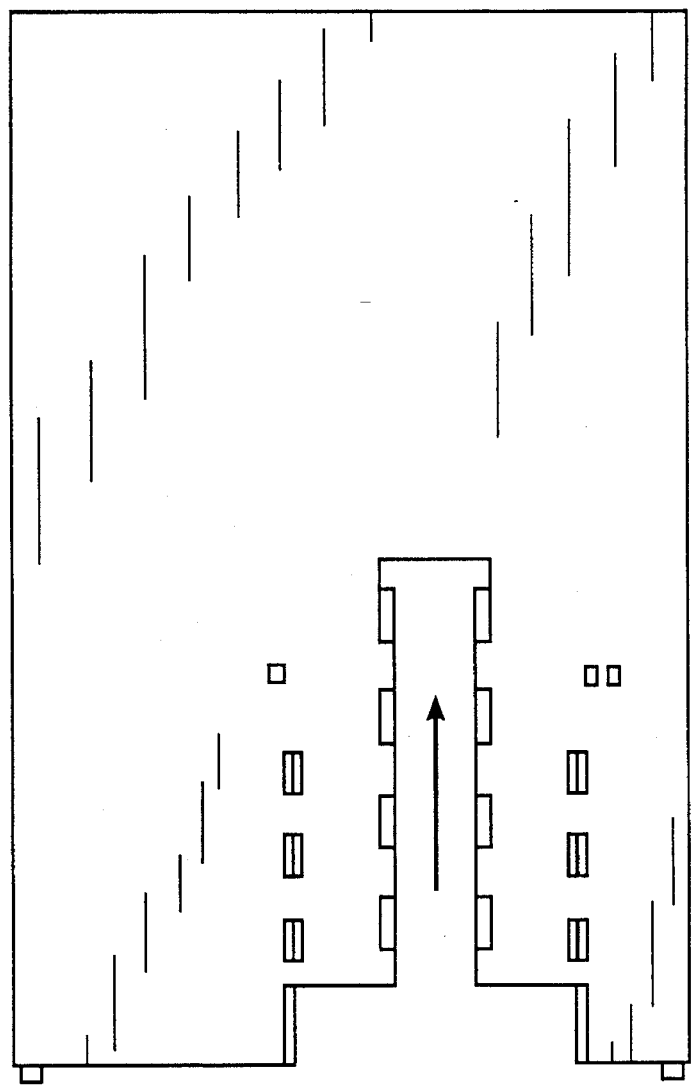
Figure 15:
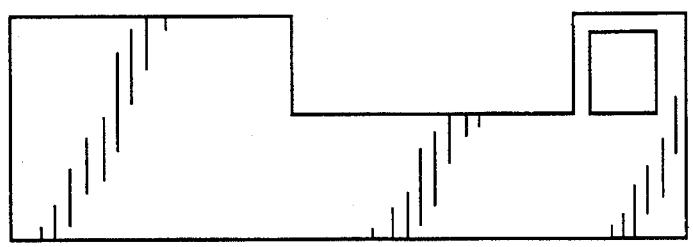
FIG. 15 illustrates the front cover of the bay of FIG. 8.

FIG. 13b shows an alternative position for light source 906. As explained before, depending on the position of light source 906, photodetector 908 generates the intent-to-eject signal upon detecting the presence or absence of light. FIG. 14 illustrates the top plate 930 of housing 902 in FIG. 13a. Top plate 930 includes a pair of recesses 934 and 936, as shown. The combination of these two recesses provides for a space for rack 910 to move back and forth in the direction of the arrow. FIG. 15 illustrates front cover 940 of housing 902 in FIG. 13a. Front cover 940 includes openings 942 and 944. Opening 942 has the same dimensions (width and length) as mounting recess 908 in FIG. 13a. When front cover 300 is attached to the housing, the edges of opening 942 overlap with the edges of mounting recess 904. Opening 944 provides a space to mount a communication adaptor plug, the function of which is identical to the one in the embodiment of FIG. 2a.

Figure 16:
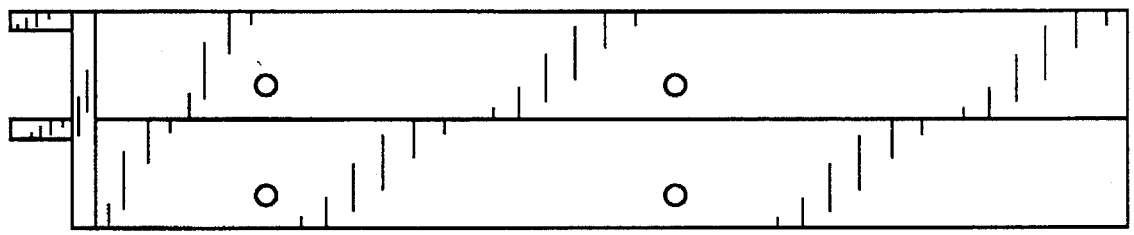
Figure 17:
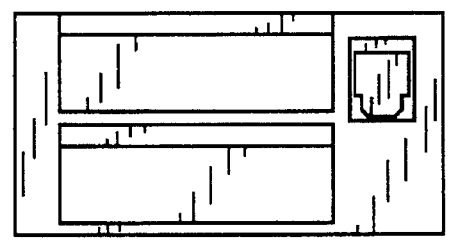
FIG. 17 illustrates the front cover for the assembly of FIG. 16.

FIG. 16 illustrates how a pair of bays 900 of FIG. 13a can be physically mated to provide a two bay assembly. Assembly 950 of FIG. 14 fits into the space allocated for a standard half height 3½ inch disk drive bay. FIG. 15 illustrates the front cover 960 for the two bay assembly of FIG. 14.

A bay according to the present invention has now been explained with reference to specific embodiments. Other embodiments will be apparent to those of ordinary skill in the art. For example, different detectors could be used to perform the function of the detectors in the embodiments explained in this application. Furthermore, each of the individual bays in FIGS. 2a, 8, and 12a can be packaged as a bay for an external hard drive. It is therefore not intended that this invention be limited except as indicated by the appended claims.

We claim:

1. An apparatus to be used in a computer system for receiving removable peripheral devices, comprising:
   a housing;
   at least one mounting means, coupled to said housing, for removably receiving at least one of said devices in an operable location in said housing;
   at least one ejector means coupled to said housing for ejecting said at least one of said devices from said operable position;
   at least one detecting means coupled to said housing for detecting the ejection of said at least one device from said operable position;
   means coupled to said housing for communicating said detection to the computer system; and
   at least one connector coupled to said housing.

2. Apparatus of claim 1 further comprising:
   a communication plug coupled to said housing; and
   an I/O means coupled to said communicating means.

3. Apparatus of claim 2, wherein said housing comprises:
   a top plate having a first recess with a first depth and a first width and a second recess in communication with said first recess, said second recess having a second depth and a second width;
   a first and second side walls on either side of said top plate;
   a separating wall, coupled to said top plate, having a first and second ends, said separating wall being shorter than said first and second wall and being located in between said first and second walls; and
   said communicating means having a bottom plate.

4. Apparatus of claim 3, wherein said at least one mounting means comprises a receiving recess being formed by said top plate, one of said first and second side walls, said separating wall, and said communicating means.

5. Apparatus of claim 4, wherein said receiving recess comprises a first side rail coupled to said one of said first and second side walls, and a second side rail coupled to said separating wall, said first and second side rails enabling said at least one device to slide in said housing.

6. Apparatus of claim 3, wherein said communicating means comprises a PC board having a plurality of electronic parts, said electronic parts allowing for communication between said at least one device and the computer system.

7. Apparatus of claim 6, wherein said I/O means comprises an I/O connector.

8. Apparatus of claim 3, wherein said communicating means comprises a flexible circuit board having a first plurality of electronic parts, said electronic parts allowing for communication between said at least one device and the computer system.

9. Apparatus of claim 8, wherein said I/O means comprises a plurality of conductive pads coupled to said flexible circuit board.

10. Apparatus of claim 9, wherein said communication means further comprise an elongated flex circuit having a first and second end, said elongated circuit being coupled between said first plurality of pads and said computer system and comprising:
    a plurality of thin strip of conductors, each extending from said first end to said second end having a plurality of thin conductors;
    a second plurality of conductive pads coupled to said first end, each of said second plurality of conductive pads being coupled to a respective one of said plurality of thin strip of conductors and to a respective one of said first plurality of conductive pads.

11. Apparatus of claim 10, wherein said elongated circuit further comprises a third plurality of conductive pads coupled to said second end, each of said third plurality of conductive pads being coupled to a respective one of said plurality of thin strip of conductors.

12. Apparatus of claim 10, wherein said elongated circuit further comprises an I/O connector coupled to said second end.

13. Apparatus of claim 3, wherein said housing further comprises a front cover having at least one opening covering said receiving recess.

14. Apparatus of claim 13, wherein said connector being connected between said second end of said separating wall and said one of said side walls.

15. Apparatus of claim 13, wherein said front cover being in communication with said first end of said separating wall.

16. Apparatus of claim 3, wherein said second depth being greater than said first depth, and said first width being greater than said second width.

17. Apparatus of claim 3, wherein said at least one ejecting means comprises:
    a rack coupled to said top plate, said rack having an elongated means, said elongated means having a first end comprising a first plurality of teeth and a second end;
    a pinion coupled to said housing, said pinion having a second plurality of teeth for meshing with said first plurality of teeth;
    means coupled to said pinion for moving said at least one device out of said housing; and an eject indicator coupled to said housing.

18. Apparatus of claim 17, wherein said rack further comprises a projecting means coupled to said second end of said elongated means.

19. Apparatus of claim 18, wherein said first and second recesses are formed in a common plane.

20. Apparatus of claim 19, wherein said rack being movable longitudinally relative to said first and second recesses.

21. Apparatus of claim 17, wherein said at least one detecting means comprising:

a photodetector coupled to said bottom plate;

a light means for emitting light to said photodetector coupled to said bottom plate; and wherein when said rack moves longitudinally relative to said first and second recesses, said pinion moves causing said eject indicator to move, said movement of said eject indicator allowing said light to reach said photodetector.

22. Apparatus of claim 21, wherein said photodetector has means for generating a signal upon detecting said light, said signal being communicated to the computer system via said communicating means and said I/O connector.

23. Apparatus of claim 22, wherein the computer system has means for completing a task currently being executed in response to said signal.

24. Apparatus of claim 22, wherein the computer system has means for disconnecting the power to said at least one device in response to said signal.

25. Apparatus of claim 1, wherein said connector comprises a PCMCIA type connector.

26. Apparatus to be used in a computer system for receiving removable peripheral devices, comprising:

a housing;

a first mounting means, coupled to said housing, for removably receiving a first device in a first operable location in said housing;

a second mounting means, coupled to said housing, for removably receiving a second device in a second operable location in said housing;

a first ejector means coupled to said housing for ejecting said first device from said first operable location;

a second ejector means coupled to said housing for ejecting said second device from said second operable location;

a first detecting means coupled to said housing for detecting said ejection of said first device from said housing;

a second detecting means coupled to said housing for detecting said ejection of said second device from said housing;

means coupled to said housing for communicating said detections to the computer system; and a first and a second connector coupled to said housing.

27. Apparatus of claim 26 further comprising:

a communication plug coupled to said housing; and a first and a second I/O means coupled to said communicating means.

28. Apparatus of claim 27, wherein said housing comprises:

a top plate having a first and second recesses recess with a first depth and a first width and a third and a fourth recesses having a second depth and a second width, said first recess being in communication with said third recess, and said second recess being in communication with said fourth recess;

a first and second side walls on either side of said top plate, said side walls being coupled to said top plate;

a separating wall coupled to said top plate, said separating wall having a first side facing said first side wall, a second side facing said second side wall, and a first and second ends, said separating wall being shorter than said first and second wall and being located in between said first and second walls; and said communicating means having a bottom plate.

29. Apparatus of claim 28, wherein said first mounting means comprises a first receiving recess, said first receiving recess being formed by said top plate, said first side wall, said first face of said separating wall, and said communicating means.

30. Apparatus of claim 28, wherein said second mounting means comprises a second receiving recess, said second receiving recess being formed by said top plate, said second side wall, said second face of said separating wall, and said communicating means.

31. Apparatus of claim 29, wherein said first receiving recess comprises a first side rail coupled to said first side wall, a second side rail coupled to said first face, said first and second side rails enabling said first device to slide in said first mounting means.

32. Apparatus of claim 29, wherein said second receiving recess comprises a first side rail coupled to said second side wall, a second side rail coupled to said second face, said first and second side rails enabling said second device to slide in said second mounting means.

33. Apparatus of claim 28, wherein said communicating means comprises a PC board, having a plurality of electronic parts, said electronic parts allowing for communication between said first and second devices and the computer system.

34. Apparatus of claim 33, wherein said I/O means comprises an I/O connector.

35. Apparatus of claim 29, wherein said communicating means comprises a flexible circuit board having a first plurality of electronic parts, said electronic parts allowing for communication between said at least one device and the computer system.

36. Apparatus of claim 35, wherein said I/O means comprises a plurality of conductive pads coupled to said flexible circuit board.

37. Apparatus of claim 36, wherein said communication means further comprise an elongated flex circuit having a first and second end, said elongated circuit being coupled between said first plurality of pads and said computer system and comprising:

a plurality of thin strip of conductors, each extending from said first end to said second end having a plurality of thin conductors;

a second plurality of conductive pads coupled to said first end, each of said second plurality of conductive pads being coupled to a respective one of said plurality of thin strip of conductors and to a respective one of said first plurality of conductive pads.

38. Apparatus of claim 37, wherein said elongated circuit further comprises a third plurality of conductive pads coupled to said second end, each of said third plurality of conductive pads being coupled to a respective one of said plurality of thin strip of conductors.

39. Apparatus of claim 37, wherein said elongated circuit further comprises an I/O connector coupled to said second end.

40. Apparatus of claim 28, wherein said housing further comprising a front cover having a first and a second opening covering said first and second receiving recesses.

41. Apparatus of claim 40, wherein said front cover being in communication with said first end of said separating wall.

42. Apparatus of claim 41, wherein said first connector being coupled between said second end of said separating wall and said first side wall.

43. Apparatus of claim 41, wherein said second connector being coupled between said second end of said separating wall and said second side wall.

44. Apparatus of claim 28, wherein said second depth being greater than said first depth, and said first width being greater than said second width.

45. Apparatus of claim 28, wherein each of said first and second ejecting means comprising:

- a rack coupled to said top of said housing, said rack having an elongated means, said elongated means having a first end comprising a first plurality of teeth, and a second end;
- a pinion coupled to said housing, said pinion having a second plurality teeth for meshing with said first plurality teeth;
- means coupled to said pinion for moving the device out of said housing; and
- an eject indicator coupled to said pinion.

46. Apparatus of claim 45, wherein said rack further comprising a projecting means coupled to said second end of said elongated means.

47. Apparatus of claim 46, wherein a combination of said first and third recesses and a combination of said second and fourth recesses are formed in a common plain.

48. Apparatus of claim 47, wherein said rack of said first ejecting means being movable longitudinally relative to said first and third recesses, and said rack of said second ejecting means being movable longitudinally relative to said second and third recesses.

49. Apparatus of claim 45, wherein each of said first and second detecting means comprise;

- a photodetector coupled to said bottom plate;
- a light means for emitting light to said photodetector;
- wherein in said first ejecting means when said rack moves longitudinally, said pinion moves causing said eject indicator to move, said movement of said eject indicator allowing said light from said light means to reach said photodetector; and
- wherein in said second ejecting means when said rack moves longitudinally, said pinion moves causing said eject indicator to move, said movement of said eject indicator allowing said light from said light means to reach said photodetector.

50. Apparatus of claim 49, wherein in said first ejecting means, said photodetector generates a first signal upon detecting said light, said first signal being communicated to the computer system via said communicating means and said I/O connector.

51. Apparatus of claim 49, wherein in said second ejecting means, said photodetector generates a second signal upon detecting said light, said second signal being communicated to the computer system via said communicating means and said I/O connector.

52. Apparatus of claim 50, wherein the computer system has means for completing a task currently being executed in response to said first signal.

53. Apparatus of claim 51, wherein the computer system has means for completing a task currently being executed in response to said second signal.

54. Apparatus of claim 50, wherein the computer system has means for disconnecting the power to said first device in response to said first signal.

55. Apparatus of claim 51, wherein the computer system has means for disconnecting the power to said second device in response to said second signal.

56. Apparatus of claim 26, wherein said first and second connectors comprise a PCMCIA type connector.

57. In a computer system having a bay for receiving removable peripheral devices, said bay having a housing for receiving the devices, a means for communicating information to the computer system and an apparatus for ejecting the devices, said apparatus comprising:

- a rack coupled to said bottom of said housing, said rack having an elongated means, said elongated means having a first end comprising a first plurality of teeth and a second end;
- a pinion coupled to said housing, said pinion having a second plurality of teeth for meshing with said first plurality of teeth;
- means coupled to said pinion for pushing the device out of said housing; and
- an eject indicator coupled to said pinion.

58. Apparatus of claim 57, wherein said rack further comprising a projecting means coupled to said second end of said elongated means.

59. Apparatus of claim 58, wherein the housing having recesses allowing said rack to move in said housing.

60. Apparatus of claim 58, wherein said at least one detecting means comprising;

- an photodetector coupled to said housing;
- a light means emitting light to said photodetector; and
- wherein when said rack moves toward the back of said housing, said pinion moves in radial direction causing said eject indicator to move, said movement of said eject indicator allowing said light from said light means to reach said photodetector.

61. Apparatus of claim 60, wherein said photodetector has means for generating a signal upon detecting said light said signal being communicated to the computer system via said communicating means.

62. Apparatus of claim 61, wherein said computer system has means for completing a task currently being executed in response to said signal.

63. Apparatus of claim 61, wherein the computer system disconnects the power to the device in response to said signal.

* * * * *